W. H. A. EMANUEL

July 15, 1930. Re. 17,731

HANDLE FOR FLY SWATTERS AND OTHER UTENSILS AND IMPLEMENTS

Original Filed Oct. 14, 1926

Inventor
Walter H. A. Emanuel

By Clarence A. O'Brien
Attorney

Reissued July 15, 1930 Re. 17,731

UNITED STATES PATENT OFFICE

WALTER H. A. EMANUEL, OF FAIRCHILD, WISCONSIN, ASSIGNOR TO U. S. MANUFACTURING CORPORATION, OF DECATUR, ILLINOIS, A CORPORATION OF ILLINOIS

HANDLE FOR FLY SWATTERS AND OTHER UTENSILS AND IMPLEMENTS

Original No. 1,685,990, dated October 2, 1928, Serial No. 141,582, filed October 14, 1926. Application for reissue filed March 21, 1929. Serial No. 348,324.

This invention relates to new and useful improvements in handles for fly swatters and other utensils and implements, and has for its primary object the provision of a device of this character wherein the handle portion thereof is readily extensible.

A further object is to provide a swatter of this character that is extremely simple of construction, inexpensive of manufacture, and highly novel and useful for the purposes intended.

Another object of this invention is the provision of an extensible handle construction composed of two parts, one frictionally and slidably fitting within the other so that the two parts may be adjusted to different positions relative to each other.

Other objects and advantages of the invention will become apparent from the following description taken in connection with the accompanying drawing.

Figure 1:
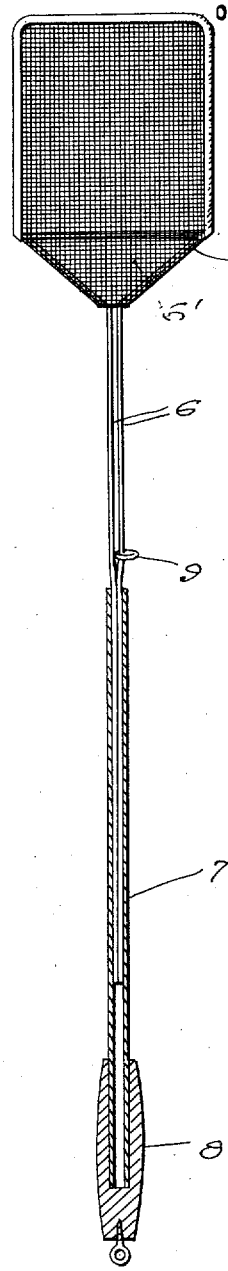
Figure 2:
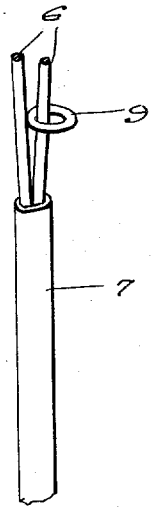

In the accompanying drawing forming a part of this application, and in which like numerals indicate like parts:

Figure 1 is a view partly in elevation and partly in longitudinal section of a fly swatter, having a handle, constructed in accordance with the present invention, and Figure 2 is an enlarged fragmentary elevation of the extensible handle at the union between the sections of the handle.

Now having particular reference to the drawing, 5 designates a fly swatter head of conventional design, the inner edge of which is provided with a pair of relatively elongated slightly spaced rods 6—6 that afford the shank portion of the handle for the swatter. The other section of the handle designated by the reference character 7 is in the form of a relatively elongated metallic tube having arranged upon its outer end a suitable hand engaging head 8. The elongated rods 6, as shown, are preferably formed as integral extensions from a head 6′ to which the fly swatter or other article is connected. This head 6′ may be triangular, as shown in Figure 1, or of various other shapes. These parts are preferably formed or bent from a single piece of wire. The metallic tube 7 has a flattened bore to slidably and frictionally receive, side by side, the free end portions of the rods or strands 6, as clearly shown in Figure 1 of the drawing.

As clearly disclosed in both Figures 1 and 2, I arrange a ring 9 over one of the rods 6 after which the ends of the rods outwardly of the ring are inserted within the tubular section 7 of the handle. The shank and tubular portions are then adjusted with respect to each other so that the desired length of the handle may be secured after which the ring 9 is moved toward the adjacent end of the tube 7, for causing the rods 6—6 to be forced apart directly at the end of the tube 7 which will, of course, wedge said rods at this point within the tube for preventing the movement of the sections with respect to each other.

It will thus be seen that I have provided a highly novel, simple and efficient form of fly swatter wherein the handle is of such a construction as to permit of the ready extension of the same. This handle construction is also adapted for use in connection with other utensils and implements, where capability of extension and adjustment is desirable; and even though I have herein shown and described the invention as consisting of certain detailed structural elements, it is nevertheless to be understood that some changes may be made therein without affecting the spirit and scope of the appended claims.

Having thus described the invention, what I claim as new and desire to secure by Letters Patent is:—

1. In a fly swatter of the class described, a swatter head, a pair of parallel spaced elongated rods extending longitudinally from the inner edge of the swatter head, a tubular handle slidably receiving the free ends of said rods, and a ring slidable on one of said rods, said ring wedging the free end portions of the rods in the tubular handle when disposed in one position, said ring further permitting said rods to be moved outwardly of the tubular handle when disposed in another position.

2. In a fly swatter of the class described, a swatter head, a pair of parallel spaced relatively elongated rods extending longitudinally from the inner edge of the swatter head, a relatively elongated tube within which the free ends of the rods are adapted for disposition, a separating member carried by only one of the rods and slidable there-along for expanding the rods at a point directly adjacent the inner end of the tube when said separating member is disposed in one position, the separating member further permitting the rods to be moved outwardly of the tube when said separating member is disposed in another position remote from the inner end of the tube.

3. In a fly swatter of the character described, a fly swatter head, a handle construction connected thereto, including a pair of spaced elongated rods secured to and extending from said head and a tube having a flattened bore of such size as to slidably and frictionally receive the free end portions of said rods, whereby said rods may be adjusted and held in various positions relative to said tube.

4. In a fly swatter of the character described, a fly swatter head, a handle construction connected thereto, including a pair of spaced elongated rods extending from said head and a tube having a flattened bore of such size as to slidably and frictionally receive the free end portions of said rods, whereby said rods may be adjusted and held in various positions relative to said tube, and means for causing additional frictional engagement of said rods with said tube.

5. An extensible handle construction, including in combination, two sections, one section being formed with a pair of elongated strands, said strands being normally spaced apart, the other section being formed of an elongated tube open at one end and having a flattened bore therein of such cross-sectional area as to slidably and frictionally receive therein, side by side said elongated strands, whereby said sections may be adjusted and held in various positions relative to each other.

6. An extensible handle construction including in combination two sections, one section being formed of an elongated tube having a flattened bore therein open at one end, the other section being formed of wire bent to form a head and a pair of elongated strands with free-end portions extending directly from said head, said free-end portions frictionally and slidably fitting side by side in the bore of said tube, whereby said second section may be adjusted and held in various positions relative to said first section.

7. An extensible handle construction, including in combination, two sections, one section being formed of an elongated flattened tube, open at one end, the other section being formed with a pair of elongated strands, said strands frictionally and slidably fitting side by side within said tube, and means for causing additional frictional engagement of said strands with said tube, whereby said second handle section may be adjusted and held in various positions relative to said first handle section.

8. A device of the character described, including in combination, an extensible handle construction comprising two handle parts, one handle part being formed with a pair of integral elongated strands, a second handle part formed of an elongated flattened metallic tube open at one end, the strands of said first handle part being parallel but normally spaced apart and fitting slidably side by side within said tube, whereby they frictionally engage the sides thereof so that said handle parts may be adjusted and held in various positions relative to each other.

9. A device of the character described, including in combination, an extensible handle construction comprising two parts, one part being formed of wire bent to form a head and a pair of integral elongated strands with free-end portions extending directly from said head, a second handle part formed of an elongated flattened metallic tube open at one end, the free-end portions of said first handle part being parallel but normally spaced apart and fitting slidably side by side within said tube, whereby they frictionally engage the sides thereof so that said handle parts may be adjusted and held in various positions relative to each other, and means for causing additional frictional engagement between said strands and said tube supplementing the normal friction between the free-end portions of the strands and the tube.

10. In a fly swatter of the character described, a fly swatter head, a handle construction connected thereto including a pair of spaced elongated rods extending from said head, and a tube having a flattened bore of such size as to slidably and frictionally receive the free end portions of said rods, whereby said rods may be adjusted and held in various positions relative to said tube, and means on one of said rods for causing additional frictional engagement of said rods with said tube.

11. In a fly swatter of the character described, a fly swatter head, a handle construction connected thereto, including a pair of spaced elongated rods extending from said head and a tube having a flattened bore of such size as to slidably and frictionally receive the free end portions of said rods, whereby said rods may be adjusted and held in various positions relative to said tube, and a ring mounted on one of said rods for causing additional frictional engagement of said rods with said tube.

In testimony whereof, I affix my signature.

WALTER H. A. EMANUEL.